(No Model.)
R. C. JENNER.
HOOF CLEANING TOOL
No. 502,042. Patented July 25, 1893.
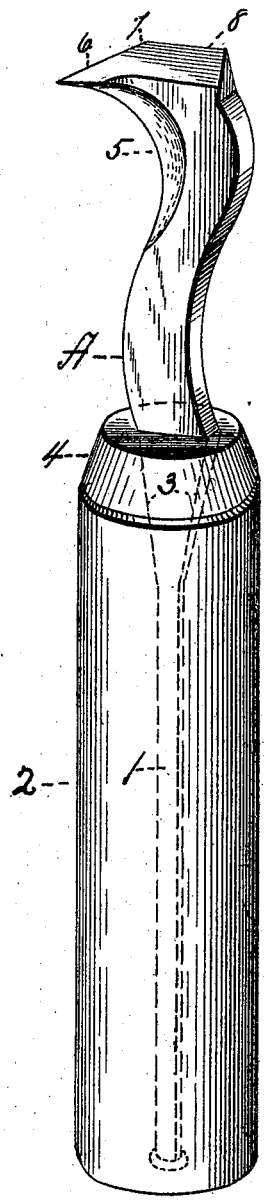
Witnesses
F. L. Ourand
A. G. Heysman
Inventor
Robert C. Jenner
by C. L. Trevitt
Attorney

UNITED STATES PATENT OFFICE.

ROBERT C. JENNER, OF SAN ANTONIO, TEXAS.

HOOF-CLEANING TOOL.

SPECIFICATION forming part of Letters Patent No. 502,042, dated July 25, 1893.

Application filed January 25, 1893. Serial No. 459,693. (No model.)

*To all whom it may concern:*

Be it known that I, ROBERT C. JENNER, a citizen of the United States of America, residing in San Antonio, in the county of Bexar, in the State of Texas, have invented a new and useful Tool for Cleaning Hoofs, of which the following is a specification.

My invention relates to improvements in farriery implements or tools of that kind or class used for removing obstructions from the hoofs of animals; and the object is to provide an improved tool of the kind, and for the purposes named, whereby all foreign and adhering substances may be speedily, thoroughly and conveniently removed from the horse's hoof.

I have fully and clearly illustrated my invention in the accompanying drawing, wherein the tool is illustrated in a single figure, and reference being thereto had, A designates the tool formed with a shank 1, shown in dotted lines, and having fitted thereto a substantial handle 2, substantially as shown; the shank at that portion entering the inner portion of the handle being tapered, as at 3, and to strengthen the handle, a ferrule 4, is fitted thereon, as shown. The blade of the tool is bent with a double curve, as shown, and the outer portion, on one edge is sickle-shaped and sharpened as at 5 from the extremity of which portion the metal is inclined outward for a distance, and sharpened, as at 6; the parts 5 and 6 forming a point at their juncture; from the point 7 of this sharpened part 6 the edge is straight, as at 8, forming a chisel edge, which is arranged substantially at right angles to the shank and with the line of the shank, if extended, running through the middle thereof. The sickle-shaped or curved portion 5 serves to engage and cut adhering substances, such as dirt, gravel, and ice, from horses' hoofs, and then when this is removed, the point is run between the hoof and the shoe, thereby removing the dirt or gravel between them. After having cleaned the hoof in this manner, the parts 6 and 8 are brought into use to scrape all remaining substances from the hoof, thereby leaving it in a perfectly clean condition.

The tool is made out of good steel, with a wooden handle, held on the shank by any suitable fastening, at the end, substantially as shown.

Having thus described my invention, what I claim, and desire to secure by Letters Patent, is—

A tool for removing obstructions from and cleaning horses' hoofs, formed with a shank provided with a handle, and a double-curved blade having a sickle-shaped and sharpened portion 5, an outwardly flaring sharp portion 6 forming a tapering point at the juncture with the portion 5, and the straight chisel-edge 8, arranged at right angles to the axis of the handle and shank, substantially as and for the purpose specified.

In witness whereof I have hereto set my hand in the presence of two attesting witnesses.

ROBERT C. JENNER.

Attest:
 GEO. DULLNIG,
 H. O. ENGELKE.